US011899401B2

(12) United States Patent
Fleury

(10) Patent No.: US 11,899,401 B2
(45) Date of Patent: Feb. 13, 2024

(54) DRIVE DEVICE FOR A DISPLAY ELEMENT

(71) Applicant: ROLEX SA, Geneva (CH)

(72) Inventor: Christian Fleury, Challex (FR)

(73) Assignee: ROLEX SA, Geneva (CH)

( * ) Notice: Subject to any disclaimer, the term of this patent is extended or adjusted under 35 U.S.C. 154(b) by 462 days.

(21) Appl. No.: 16/731,403

(22) Filed: Dec. 31, 2019

(65) Prior Publication Data

US 2020/0218199 A1 Jul. 9, 2020

(30) Foreign Application Priority Data

Jan. 7, 2019 (EP) .................................... 19150503

(51) Int. Cl.
*G04B 19/24* (2006.01)
*G04B 13/02* (2006.01)

(52) U.S. Cl.
CPC ............ *G04B 19/24* (2013.01); *G04B 13/02* (2013.01)

(58) Field of Classification Search
CPC .. G04B 13/02; G04B 19/24; G04B 19/25373; G04B 11/006; G04B 19/2576; G04B 19/25
See application file for complete search history.

(56) References Cited

U.S. PATENT DOCUMENTS 8,760,975 B2 * 6/2014 Rudaz .................... G04B 19/25 368/37
2003/0151981 A1 * 8/2003 Vernay ............... G04B 19/2536 368/37
2007/0091727 A1 * 4/2007 Bonvin ................. G04F 7/0847 368/107
2011/0299365 A1 * 12/2011 De Biase ............. G04B 19/241 368/70
2012/0014224 A1 1/2012 Gabathuler et al.
2012/0057434 A1 3/2012 Rudaz

FOREIGN PATENT DOCUMENTS

EP 2 407 833 A1 1/2012
EP 2 428 855 A1 3/2012

OTHER PUBLICATIONS

European Search Report and Written Opinion dated Jul. 11, 2019 issued in counterpart application No. EP19150503; w/ English machine translation (14 pages).

* cited by examiner

*Primary Examiner* — Sean Kayes
(74) *Attorney, Agent, or Firm* — WHDA, LLP

(57) ABSTRACT

A drive device for a display element for displaying a quantity associated with time or derived from time,
includes a cam that is pivoted about a first axis and designed to drive the movement of the display element, the cam having a peak,
a lever that is pivoted about a second axis, and
a spring that is designed to return the lever into contact with the cam, wherein an angle (α) is formed, in a plane perpendicular to the first and second axes, between
(i) a straight line passing through
(a) the contact point between the peak, in particular the point is farthest from the first axis, and the lever, and
(b) the first axis, and
(ii) a straight line passing through the first axis (A3) and the second axis, the angle (α) is less than or equal to 70°.

19 Claims, 6 Drawing Sheets

DRIVE DEVICE FOR A DISPLAY ELEMENT

This application claims priority of European patent application No. EP 19150503.1 filed on Jan. 7, 2019, the content of which is hereby incorporated by reference herein in its entirety.

The invention relates to a drive device for a display element. The invention also relates to a calendar system or module comprising such a device. The invention also relates to a timepiece movement comprising such a device or such a system or such a module. Finally, the invention relates to a timepiece comprising such a device or such a system or such a module or such a movement.

In particular, the invention relates to a drive device for instantaneously changing the display from one value of a quantity associated with time or derived from time, for example the date or hour, to another.

Devices generally having a drive member made up of a finger secured to a cam are known, said cam cooperating with an energy accumulator in order that this member can instantaneously drive, at least by an angular step, a toothset of a display member, said toothset being angularly indexed by a jumper. The energy accumulator is usually made up of an elastic return means cooperating with a lever, which bears against the flank of the cam under the effect of said elastic return means, and makes it possible, during the instantaneous change of the display from one value of a quantity associated with time or derived from time to another, to overcome the torque produced by said jumper under the effect of the torque restored by said elastic means.

The time of the instantaneous change of the display from one value of a quantity associated with time or derived from time to another depends on a number of parameters, for example the coefficients of friction between the elements involved in the drive device, in particular with regard to the means for pivoting the drive cam and of the elements that make up the accumulator. Thus, the time of the instantaneous change can vary in particular depending on the speed of the drive cam relative to the frame of the timepiece.

In the case of a calendar mechanism, the time of the instantaneous change of the date can thus vary depending on the speeds of the different gear trains of the movement on which the calendar mechanism is mounted. In the conventional time display mode, the speed of the drive cam is defined unequivocally by the speed of the going train of the movement that drives said cam. However, in the time adjusting mode, for example, the speed of the drive cam can vary according to the speed of a time setting gear train that can likewise drive said cam. Thus, the time of the instantaneous change of date can vary slightly depending on the operating mode of the movement. As a result, a jump of date can take place while the timepiece, in particular the hour and minute hands, is not indicating exactly midnight. Similarly, in the case of a timepiece with jumping hours, a jump of the hour display can take place while the timepiece, in particular the minute hand, is not indicating exactly a whole hour.

This is because, in practice, it is delicate to unequivocally define the location of the cam profile peak triggering, for example, a jump of date. Also in practice, the peak is more like a surface, in particular a rounded surface, than a point or edge on account of the methods for manufacturing the cam, and in particular the methods for finishing same.

The aim of the invention is to provide a drive device for a display element that makes it possible to improve the devices known from the prior art. In particular, the invention proposes a drive device for a display element, the operation of which is optimized in terms of reliability and precision.

In particular, the invention proposes a drive device for a display element that makes it possible to trigger, without or substantially without any distinction between the normal operating mode and the correction mode of the timepiece, a jump of display for given and predefined positions of other display elements.

According to the invention, a drive device according to the invention is defined by example 1 below.

1. A drive device for a display element for displaying a quantity associated with time or derived from time, comprising:
   - a cam that is pivoted about a first axis and designed to drive the movement of the display element, the cam comprising a peak,
   - a lever that is pivoted about a second axis, and
   - a spring that is designed to return the lever into contact with the cam, an angle formed, in a plane perpendicular to the first and second axes, between:
   - a straight line passing through:
     - the contact point between the peak, in particular the point farthest from the first axis, and the lever, and
     - the first axis, and
   - a straight line passing through the first axis and the second axis, this angle being less than or equal to 70°, or even less than or equal to 65°, or even less than or equal to 60°, or even equal or substantially equal to 57°.

Various embodiments of the device are defined by examples 2 to 11.

2. The device according to example 1, wherein the angle is greater than or equal to 30°, or even greater than or equal to 35°, or even greater than or equal to 40°.

3. The device according to example 1 or 2, wherein the lever comprises a roller intended to come into contact with the cam, in particular a roller made of hard material minimizing friction, such as a ruby roller.

4. The device according to one of examples 1 to 4, wherein the roller is mounted on the lever so as to pivot about a third axis.

5. The device according to one of examples 3 or 4, wherein the roller has a radius less than or equal to 1 mm.

6. The device according to one of examples 3 to 5, wherein the angle is defined as the angle between:
   - a straight line passing through the first axis and the second axis, and a straight line passing through a center of curvature of the peak and a center of the roller and the first axis.

7. The device according to one of examples 1 to 6, wherein the peak is a rounded surface having a radius less than 0.1 mm.

8. The device according to one of examples 1 to 7, wherein the cam has at least one concave surface adjacent to the peak, or wherein the cam has two concave surfaces on either side of the peak.

9. The device according to one of examples 1 to 8, wherein the cam comprises at least one drive finger for a display element, and/or wherein the quantity associated with time or derived from time comprises dates of a timepiece calendar.

10. The device according to one of examples 1 to 9, wherein the device comprises a drive wheel, in particular a 24-hours wheel, and a connection that provides a degree of freedom between the drive wheel and the cam, in particular a connection of the type having a pin cooperating with an elongate cutout designed to secure the cam and the drive wheel, or a connection of the freewheel type designed to secure the cam and the drive wheel.

11. The device according to one of examples 1 to 10, wherein the distance between the second axis and the contact point of the lever with the cam or the distance between the second axis and the third axis is less than or equal to 4 times the maximum radius of the cam or the distance between the first axis and the point, or even less than or equal to 3 times the maximum radius of the cam or the distance between the first axis and the point, or even less than or equal to 2.5 times the maximum radius of the cam or the distance between the first axis and the point.

According to the invention, a timepiece calendar system or module according to the invention is defined by example 12.

12. A timepiece calendar system or module comprising a device according to one of examples 1-11.

An embodiment of the timepiece calendar system or module is defined by example 13.

13. The system or module according to one of examples 1 to 12, which comprises a display element comprising a display disk, in particular a display disk intended to cooperate with an aperture and/or intended to cooperate with at least one drive finger secured to the cam.

According to the invention, a timepiece movement according to the invention is defined by example 14.

14. A timepiece movement comprising a system or module according to one of examples 12 or 13 and/or a device according to one of examples 1 to 11.

According to the invention, a timepiece according to the invention is defined by example 15.

15. A timepiece, in particular a wristwatch, comprising a timepiece movement according to one of examples 1 to 14 and/or a system or module according to one of examples 12 and 13 and/or a device according to one of examples 1 to 11.

The appended figures show, by way of example, an embodiment of a timepiece according to the invention.

Figure 1:
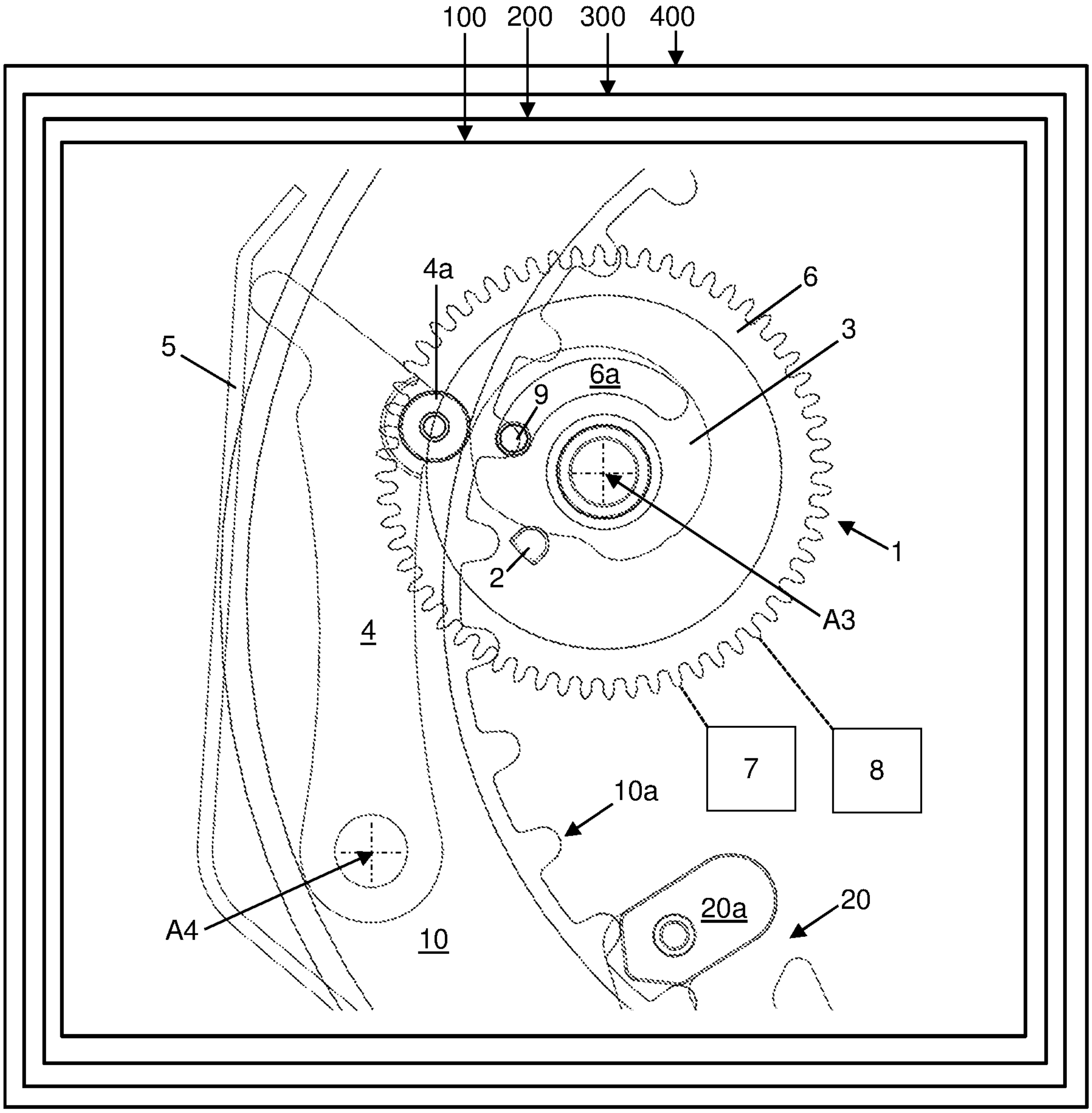
FIG. 1 is a schematic view of a first embodiment of a timepiece just before a jump of date.

A first embodiment of a timepiece 400 is described below with reference to FIGS. 1 to 5. The timepiece is for example a watch, in particular a wristwatch. The timepiece comprises a timepiece movement 300. The timepiece movement may be a mechanical movement, in particular an automatic movement. The timepiece movement may alternatively be electronic.

The movement may comprise a timepiece calendar system 200 or a timepiece calendar module 200.

The movement 300 or the timepiece calendar system 200 or a timepiece calendar module 200 comprises a drive device 100 for a display element 10 for displaying a quantity associated with time or derived from time.

The timepiece, the timepiece movement, the timepiece calendar system 200 or the timepiece calendar module 200 comprises the display element 10 for displaying the quantity associated with time or derived from time.

The quantity associated with time or derived from time may comprise or be in particular a year indication, a month indication, a day indication, a date indication, an hour indication, a minute indication.

The display element may be or comprise a disk bearing numerical and/or alphabetic and/or alphanumerical indications, in particular a disk cooperating with an aperture. Alternatively, the display element may be an indicator, such as a hand, in particular an indicator cooperating with a limb. The display element is preferably pivoted on a frame of the timepiece, of the timepiece movement, of the timepiece calendar system 200 or of the timepiece calendar module 200.

The drive device 100 of the display element 10 for displaying the quantity associated with time or derived from time comprises:

- a cam 3 that is pivoted about a first axis A3 and designed to drive the movement of the display element 10, the cam comprising a peak 3*b*,
- a lever 4 that is pivoted about a second axis A4, and
- a spring 5 that is designed to return the lever 4 into contact with the cam 3.

The cam 3 is preferably pivoted on a frame of the timepiece, of the timepiece movement, of the timepiece calendar system 200 or of the timepiece calendar module 200.

The lever 4 is preferably pivoted on a frame of the timepiece, of the timepiece movement, of the timepiece calendar system 200 or of the timepiece calendar module 200.

The drive device 100 preferably has an energy accumulator 5, such as a spring, and a drive mobile 1 provided with a drive member or finger 2 that is secured to the cam 3 cooperating with the energy accumulator 5, via the lever 4, such that the drive finger 2 can instantaneously drive (or drive in a fraction of a second), by an angular step, the display element 10, in particular a toothset 10*a* of the display element 10, said toothset being indexed in position by a beak 20*a* of a jumper 20.

The drive mobile 1 also comprises a wheel 6 that is connected to a going train 7 of the basic movement and, during conventional operation of the movement, executes one complete rotation in 24 hours. This wheel 6 is also connected to a correction train or time setting gear train 8 that is able to drive said wheel 6 at a speed that is not predefined and is dependent on adjusting habits of the wearer, during correction or time setting operation. The wheel 6 comprises an elongate cutout 6*a*, one of the ends of which is intended to drive the cam 3 and the drive finger 2 in rotation via a pin 9 fixed to the cam. Thus, the cam 3 and the finger 2, for the one part, and the wheel 6, for the other part, are able to be driven at different rotational speeds.

The energy accumulator comprises, for example, a spring 5 cooperating with the lever 4. The lever 4 comprises a roller 4*a*, in particular a roller 4*a* pivoted on the lever about an axis A4*a*. The axes A4*a* and A3 are preferably parallel. The lever is designed such that the roller 4*a* is pressed against a flank or profile of the cam. The action of the lever 4 on the cam 3 makes it possible to drive the cam 3 and the finger 2 in rotation, said finger 2 in turn driving the display element 10. This action of the lever 4, which is brought about by the spring 5, makes it possible, during the driving of the display element 10, to overcome the torque produced by the jumper 20.

For example, via the pin 9 cooperating with one end of the elongate cutout 6*a*, the wheel 6 carries along the cam 3 and accumulates the energy required for an abrupt displacement of the finger 2 such that the latter exerts a brief action on the display element 10 so as to bring about an instantaneous jump of the display element 10. This required energy is accumulated by arming the spring 5 via a first portion 3*a* of the profile of the cam 3 and the lever 4. Just before a change in position of the display element 10, i.e. just before a jump of the display element for modifying the information displayed by the display element, the lever 4 is in contact with the peak 3*b* of the profile of the cam 6, namely the zone 3*b* of one end of a portion 3*a*, which comprises the point 30*b*, which is the point of the cam farthest from the axis A3 of rotation of the cam 3. This zone 3*b* may, for example, be in the form of a curve or rounded portion 3*b*, which comprises the point 30*b* farthest from the axis A3 of rotation of the cam 3. Alternatively, this zone 3*b* may be reduced to the point 30*b* farthest from the axis A3 of rotation of the cam 3. The movement of the cam 6, of the finger 2 and of the display element 10 then takes place in a fraction of a section when the spring 5 restores the energy that it has accumulated. This energy makes it possible to communicate an abrupt rotational movement to the cam 3 and to the finger 2 via the lever 4 and its roller 4*a*, once the roller 4*a* has passed over the zone 3*b* so as to cooperate with a second portion 3*c* of the profile of the cam 3.

The relative movement between the finger 2 and the cam 3, for the one part, and the wheel 6, for the other part, is possible by virtue of the degree of freedom provided by the cutout 6*a*. Alternatively, this degree of freedom may be provided by a “freewheel” type solution disposed between the finger 2 and the cam 3, for the one part, and the wheel 6, for the other part.

Figure 3:
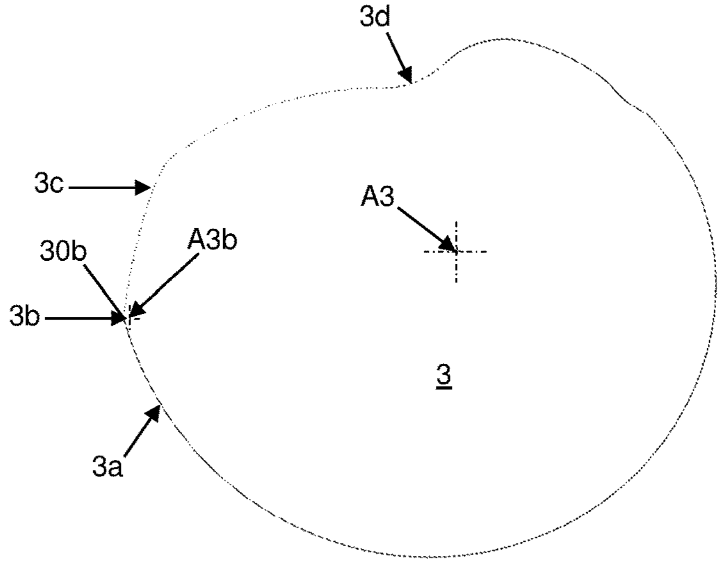
FIG. 3 is a detail view of an example of a cam of the drive device for the calendar display element.
Figure 4:
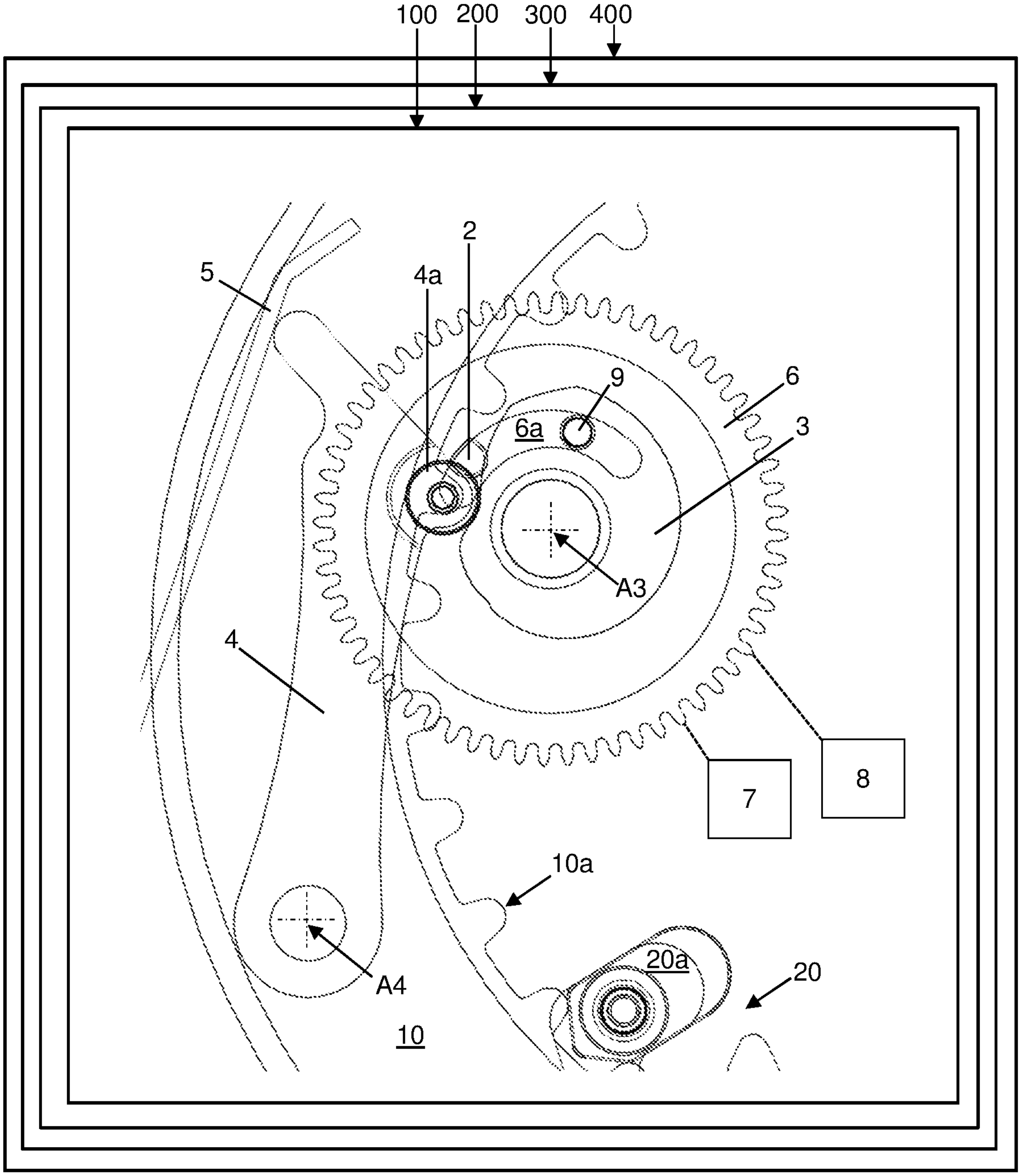
FIG. 4 is a schematic view of the first embodiment of the timepiece just after a jump of date.
Figure 5:
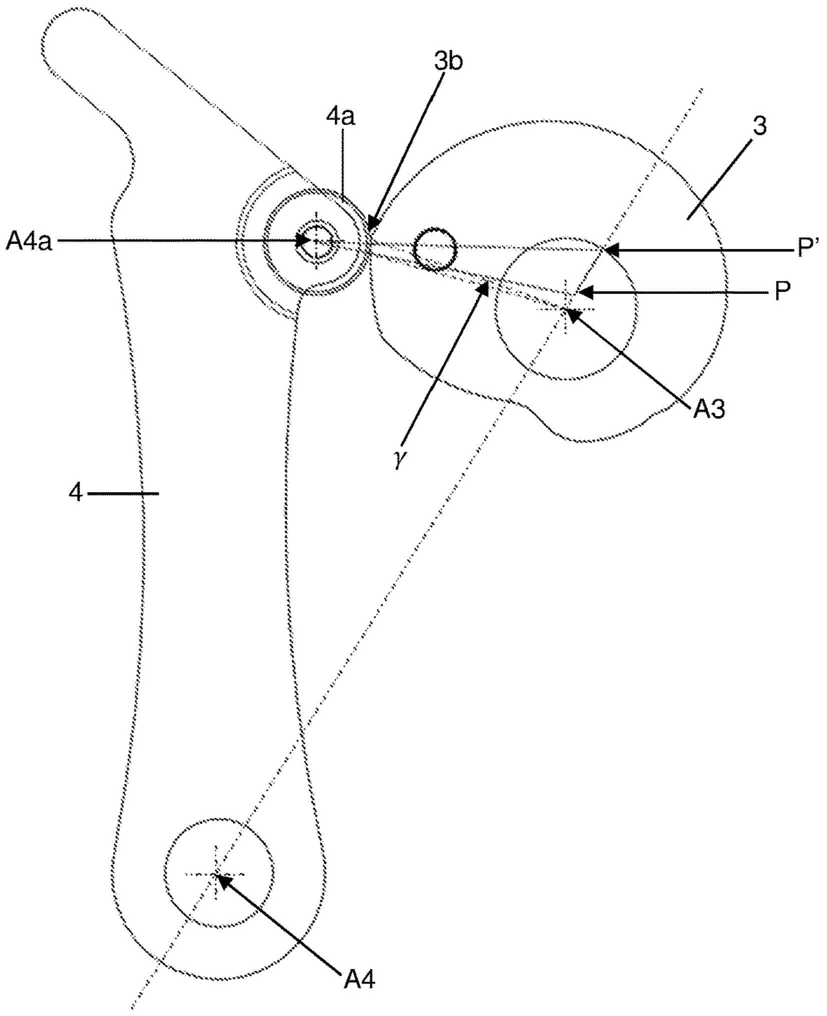
FIG. 5 is a detail view of the first example of a lever and of a cam of the drive device for the calendar display element in a transitory configuration during the jump of date.

Once the jump of display has taken place, the finger 2 is preferably positioned and held within the toothset 10*a* by virtue of the lever 4, the roller 4*a* of which is pressed against a third portion 3*d* of the profile of the cam 3, which is in the form of a recess (as shown in FIGS. 3 and 4). The finger 2 thus positioned allows the display element 10 to be braked, and avoids any risk of a double jump of display.

Figure 2:
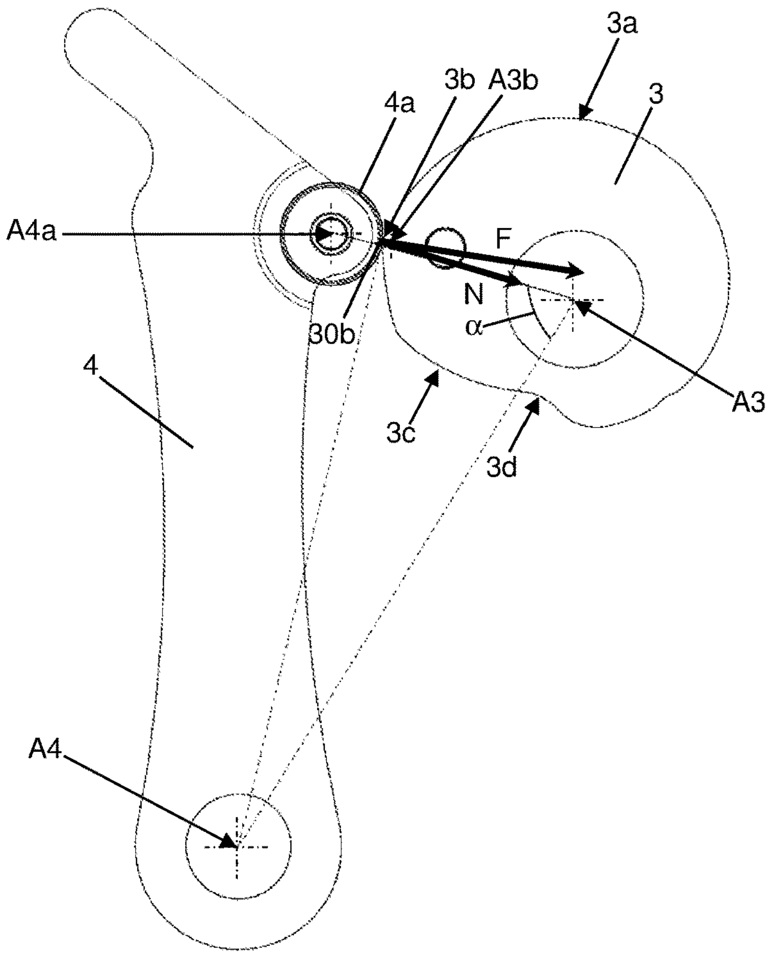
FIG. 2 is a detail view of a first example of a lever and of a cam of a drive device for a calendar display element just before a jump of date.

Thus, the zone 3*b* constitutes a transition zone between the portions 3*a* and 3*c* of the cam 3 (as shown in FIGS. 2 and 3).

Before the contact point of the lever with the cam passes over the zone 3*b*, the cam 3 is driving with respect to the lever 4 and the spring 5, under the effect of one or the other of the gear trains 7, 8, via the wheel 6. After passing over this zone 3*b*, the cam is driven under the effect of the force restored by the spring 5 and the lever 4. In other words, the zone 3*b* constitutes a transition zone in which the torque applied by the lever to the cam 3 changes sign and passes through zero.

In order to minimize the sensitivity of the drive device to the variations in friction between the components involved in said drive device, and thus to define a time of instantaneous change of date that is as unequivocal and repeatable as possible, studies by the proprietor have shown that it is advisable to maximize the variation in torque applied by the lever to the cam 3 for a given angular range of rotation of the cam.

In other words, it is advisable to maximize the derivative of the torque applied by the lever to the cam relative to the rotation of the cam $dC3/d\gamma$, where:

C3 is the torque applied by the lever to the cam or the torque at the cam 3;

$\gamma$ is the angle of rotation of the cam 3 about the first axis A3.

For this purpose, the variation in the ratio between the torque C3 at the cam 3 and the torque C4 at the lever 4, for a given rotation $\gamma$ of the cam 3, has to be maximized as far as possible, as long as the lever 4, in particular the roller 4*a*, is in contact with the zone 3*b*.

Furthermore, it has been found that the ratio C3/C4 is proportional to the ratio of the lengths A3P/A4P, where P is the intersection point of the reaction force F between the roller 4*a* and the zone 3*b* of the cam 3 with the line of the centers A3A4 connecting the axis of rotation A3 of the cam 3 to the axis of rotation A4 of the lever 4, the reaction force F optionally being turned through the angle of friction with respect to the normal to the contact N. Thus, a given increase in the torque C3 at the cam 3, when the latter is driven, corresponds to a displacement of the intersection point P on the line of the centers A3A4.

An angle $\alpha$ is defined, in a plane perpendicular to the first and second axes A3, A4, between a first straight line passing through the contact point between the peak 3*b* of the cam 3, in particular the point 30*b* farthest from the axis A3 of the cam 3, and the lever 4, and the first axis A3, and a second straight line passing through the first axis A3 and the second axis A4.

More particularly, in the particular embodiments illustrated in the figures, the angle $\alpha$ can be defined between the segments [A330*b*] and [A3A4], at the time at which the roller 4*a* is in contact with the point 30*b* of the cam 3, when the reaction force F arises. More particularly, the angle $\alpha$ in question is the angle that partially characterizes the triangle formed by the points A3, A4 and 30*b* at the time at which the roller 4*a* is in contact with the point 30*b* of the cam 3 (see FIG. 2).

When the peak 3*b* is in the form of a surface 3*b*, the angle $\alpha$ can be defined between the segments [A3A4] and the line passing through the axis A3, the center of curvature A3*b* of the surface 3*b* or of the peak 3*b* and the axis or the center A4*a* of the roller 4*a* (FIG. 2). In the particular case in which the peak 3*b* is in the form of a rounded surface or of a rounded portion 3*b*, the angle $\alpha$ can be defined between the segments [A3A4] and the line passing through the axis A3, the center A3*b* of the rounded portion 3*b* and the center A4*a* of the roller 4*a* (FIG. 2).

Of course, the contact between the lever 4 and the cam 3 can take place directly, independently of the roller 4*a*. For example, the lever 4 may comprise a contact surface intended to cooperate directly with the cam 3. This contact surface may, for example, have a center of curvature comparable to the center A4*a* of the roller 4*a*.

Studies by the proprietor have shown that, if the angle $\alpha$ decreases, the angle $\gamma$ of rotation of the cam, which is necessary for causing this displacement of the intersection point P, also decreases.

Figure 7:
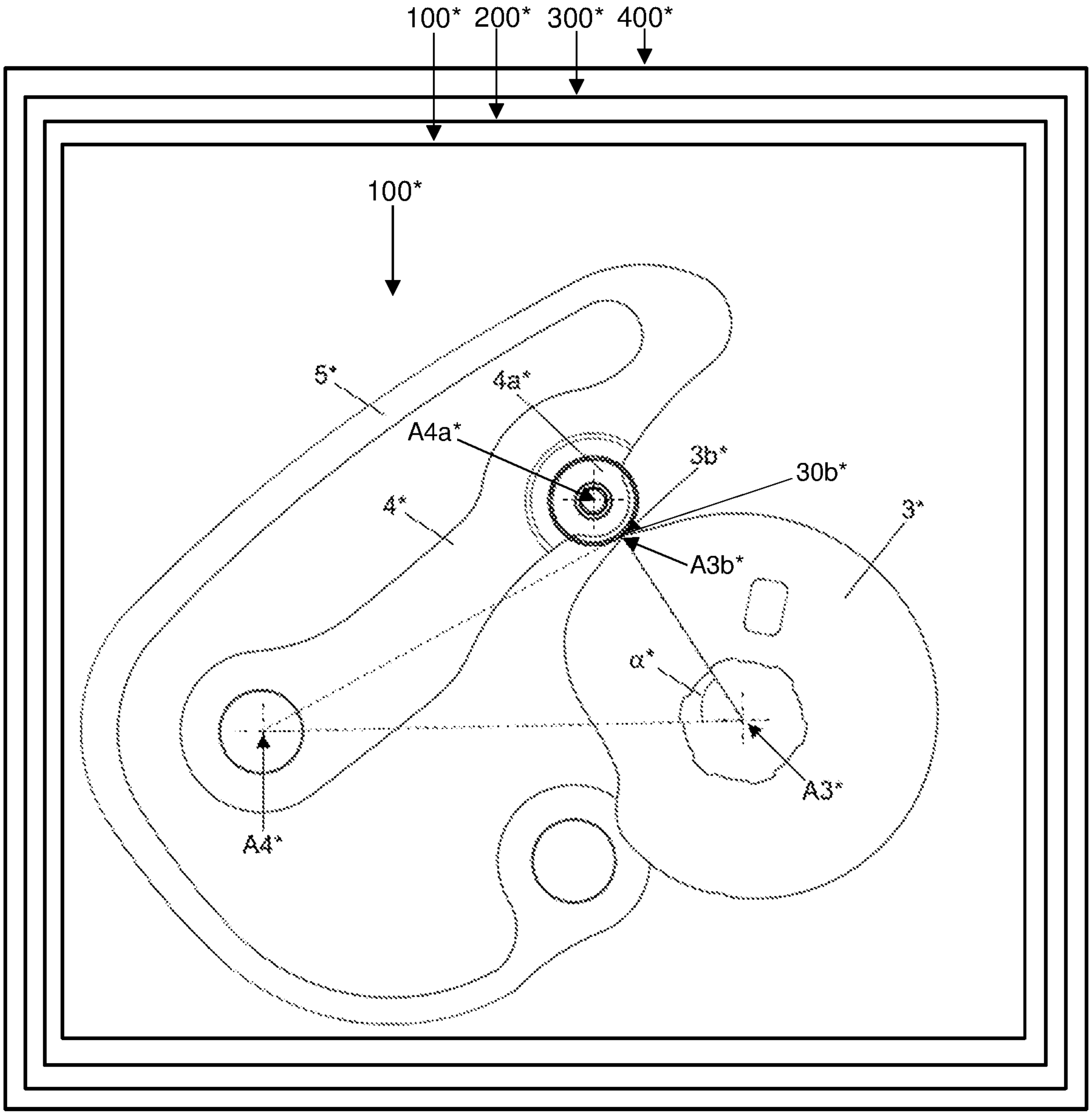
FIG. 7 is a schematic view of a second embodiment of a timepiece just before a jump of date.
Figure 8:
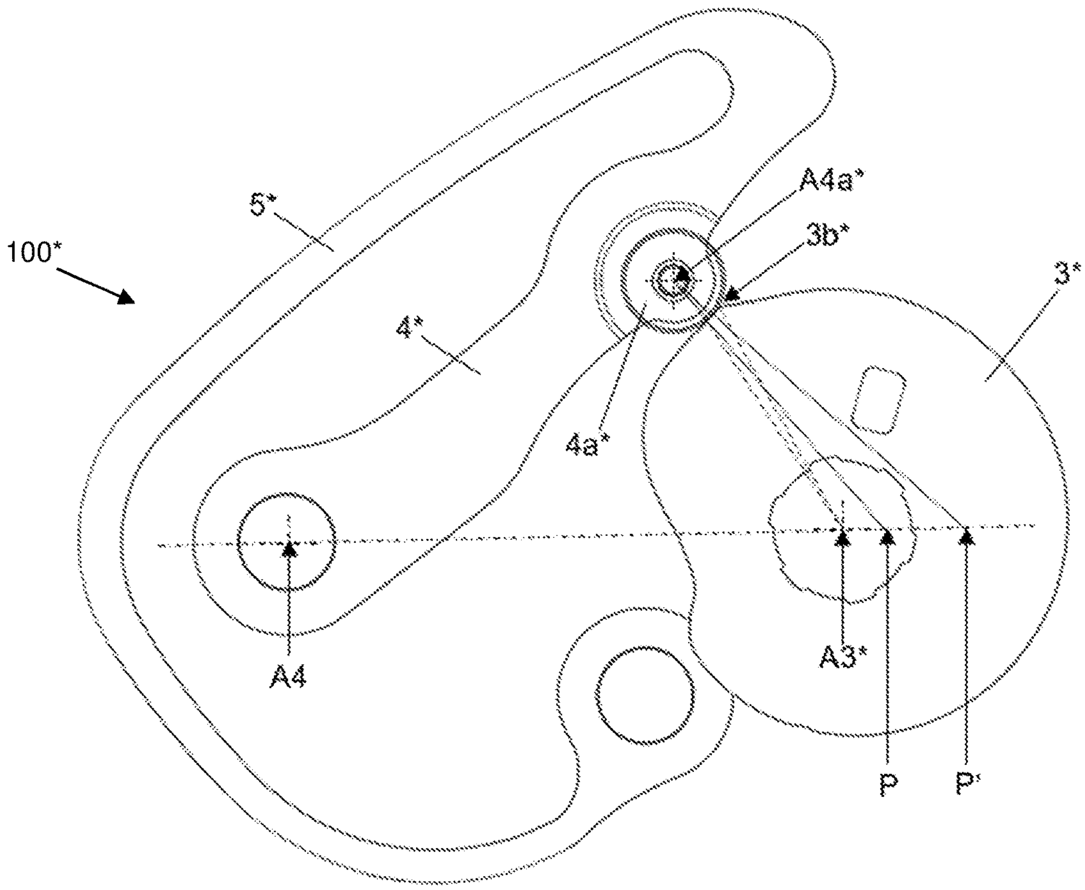
FIG. 8 is a detail view of the second example of a lever and of a cam of the drive device for the calendar display element in a transitory configuration during the jump of date.

A second embodiment of a timepiece comprising a second embodiment of a drive device 100* is shown in FIGS. 7 and 8 and described below.

Figure 6:
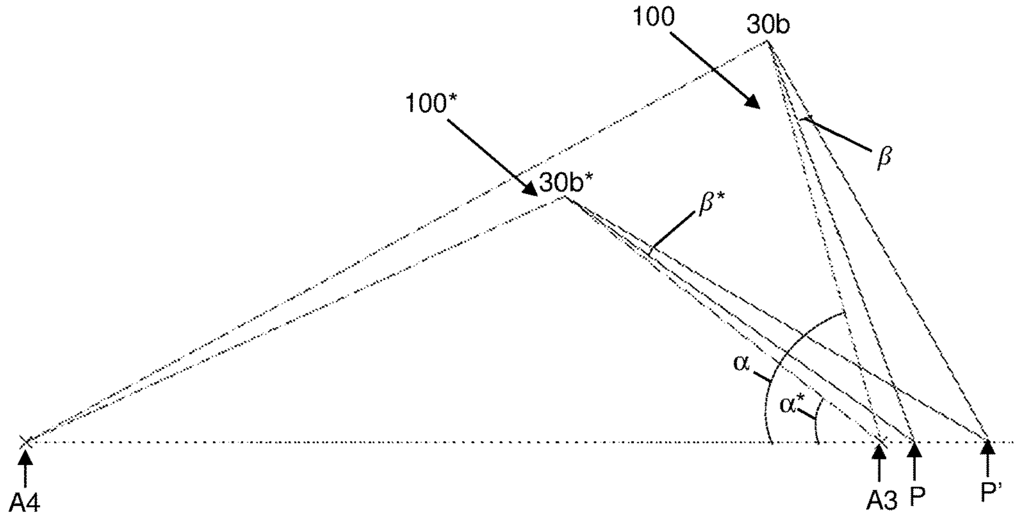
FIG. 6 is a graph illustrating the principle of optimizing the profile of the cam of the drive device for the calendar display element.

FIG. 6 shows a comparison of the first embodiment 100, in which the constituent elements are arranged at an angle $\alpha$ of 70°, and the second embodiment 100*, in which the constituent elements are arranged at an angle $\alpha^*$ substantially less than 70°, around 40°, with positions of the axes A3, A4 common to both embodiments. Each solid straight line represents the direction of the force F before and after a given rotation $\gamma$, $\gamma^*$ of each of the cams of the drive devices 100 and 100*. It can be seen that, for one and the same displacement of the point P toward a given position of a point P' on the line of the centers A3A4, the vector of the force F of the first embodiment of the device 100 has to turn through an angle β greater than an angle β* of the second embodiment of the device 100*. Thus, γ>γ*, for one and the same torque variation.

It is therefore advisable to minimize the angle α.

The patent literature discloses examples of drive devices within which the value of the angle α is around 90°. It can be shown that, in the absence of friction where the roller is guided, the variation in the torque at the cam is at a minimum for an angle α close to 90°.

By way of example, the patent application EP1746470 relates to an improved drive device for a display. FIG. 1 of the document indicates an obtuse angle α of around 98°. By way of further example, the patent application EP2015146 relates to a drive device for a display, which is designed to make it easier to quickly correct said display. FIG. 1 of the document indicates an obtuse angle α of around 110°. There is no teaching in these documents that would encourage minimizing the value of the angle α.

Thus, in the embodiments of drive devices according to the invention, an angle α is formed, in a plane perpendicular to the first and second axes A3, A4, between:

- a first straight line passing through:
  - the contact point between the peak 3*b*, in particular the point 30*b* farthest from the first axis A3, of the cam 3 and the lever 4, and
  - the first axis A3, and
- a second straight line passing through the first axis A3 and the second axis A4.

This angle α is the salient angle between these first and second straight lines.

This angle α is less than or equal to 70°, or even less than or equal to 65°, or even less than or equal to 60°, or even equal or substantially equal to 57°.

As mentioned above, a second embodiment of a timepiece 400* is described below with reference to FIGS. 7 and 8. The timepiece is for example a watch, in particular a wristwatch. The timepiece comprises a timepiece movement 300*. The timepiece movement may be a mechanical movement, in particular an automatic movement. The timepiece movement may alternatively be electronic.

The movement may comprise a timepiece calendar system 200* or a timepiece calendar module 200*.

The movement 300* or the timepiece calendar system 200* or the timepiece calendar module 200* comprises a second embodiment of a drive device 100* for a display element for displaying a quantity associated with time or derived from time.

The timepiece, the timepiece movement, the timepiece calendar system 200* or the timepiece calendar module 200* comprises the display element for displaying the quantity associated with time or derived from time.

In this second embodiment, the drive device preferably differs from the first embodiment only by the value of the angle α. In this second embodiment, α is equal to 57°.

Such an embodiment advantageously makes it possible to maximize dC3/dγ. For example, the configuration shown in FIGS. 7 and 8 has a variation in the torque at the cam that is three times greater than that of the configuration shown in FIGS. 1 to 5.

In this second embodiment, the elements having the same structure and/or function as elements of the first embodiment are identified by the same reference to which a "*" has been added.

Irrespective of the embodiment or embodiment variant of the drive device, dC3/dγ is preferably greater than or equal to 110 μNm per degree of rotation of the cam, or dC3/dγ is greater than or equal to 150 μNm per degree of rotation of the cam, or dC3/dγ is greater than or equal to 200 μNm per degree of rotation of the cam, when the lever 4 is in contact with the peak 3*b* of the cam, in particular when the roller 4*a* is in contact with the zone 3*b*, in particular the rounded surface 3*b*.

Irrespective of the embodiment or embodiment variant of the drive device, the lever and the spring can be two separate parts as in the first embodiment shown in FIGS. 1 to 5. Alternatively, irrespective of the embodiment or embodiment variant of the drive device, the lever and the spring may be formed by one and the same part, as in the second embodiment shown in FIGS. 7 and 8.

Irrespective of the embodiment or embodiment variant of the drive device, the angle α is greater than or equal to 30°, or even greater than or equal to 35°, or even greater than or equal to 40°. This makes it possible to obtain a satisfactory overall performance of the drive device. Specifically, studies by the proprietor have also shown that an angle α that is too small brings about excessive friction torque at the cam 3. Thus, α is determined so as to solve the technical problem addressed, while making it possible to obtain a satisfactory overall performance of the drive device.

Irrespective of the embodiment or embodiment variant of the drive device, the lever preferably comprises a roller 4*a*. Thus, the contact between the lever 4 and the cam 3 takes place via the roller 4*a*. This roller is advantageously movable, in particular rotatable, relative to the rest of the lever. Thus, the roller can roll over the profile of the cam. Alternatively, the roller can be mounted in a fixed manner on the rest of the lever. The roller may be made of a hard material minimizing friction with the cam, for example of synthetic ruby. The roller preferably has a radius less than or equal to 1 mm.

Figure 9:
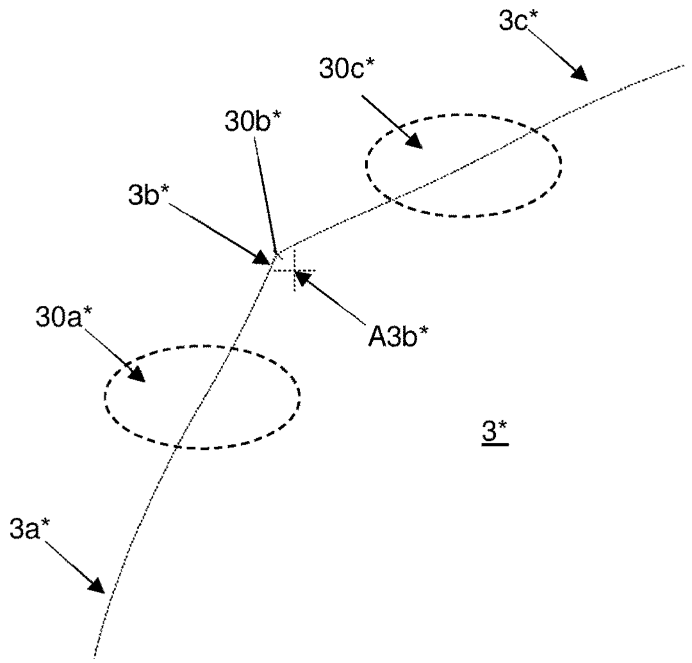
FIG. 9 is a detail view of the cam in FIGS. 7 and 8.

Irrespective of the embodiment or embodiment variant of the drive device, the peak 3*b* may be a portion of cylinder with a radius less than 0.1 mm. The cam may have at least one concave surface 3*a*, 3*c* adjacent to the peak or two concave surfaces 3*a*, 3*c* on either side of the peak. Further preferably, the peak 3*b* of the cam 3 is delimited by respective bending zones 30*a*, 30*c* of the portions 3*a* and 3*c*, as shown in FIG. 9.

Such a design makes it possible to better control the rounded portion forming the cam peak 3*b*, regardless of the methods for manufacturing the cam, and in particular the methods for finishing same.

Irrespective of the embodiment or embodiment variant, the drive device comprises a drive wheel 6, in particular a 24-hours wheel 6, and a connection that provides a degree of freedom between the drive wheel and the cam. The connection may be of the type having a pin 9 cooperating with an elongate cutout 6*a* designed to secure the cam and the drive wheel. Alternatively, the connection may be of the freewheel type designed to secure the cam and the drive wheel.

Irrespective of the embodiment or embodiment variant, besides the abovementioned improvements, the designs and arrangements of the cam 3 and lever 4 make it possible to provide a drive device 100 that is particularly compact in the main plane of the device, that is to say in a plane perpendicular to the first and/or second axes. Preferably, the distance between the second axis A4 and the contact point of the lever with the cam or the distance between the second axis A4 and the axis A4*a* is less than or equal to 4 times the maximum radius of the cam or the distance between the first axis A3 and the point 30*b*, or even less than or equal to 3 times the maximum radius of the cam or the distance between the first axis A3 and the point 30*b*, or even less than or equal to 2.5 times the maximum radius of the cam or the distance between the first axis A3 and the point 30*b*.

The invention claimed is:

1. A drive device for a display element for displaying a quantity associated with time or derived from time, comprising:

a cam that is pivoted about a first axis and designed to drive a movement of the display element, the cam including a peak;

a lever that is pivoted about a second axis, and a spring that is designed to return the lever into contact with the cam, an angle (α) is formed, in a plane perpendicular to the first and second axes, between:

a straight line passing through:

a contact point between the peak, the contact point is farthest from the first axis, and the lever, and the first axis, and a straight line passing through the first axis and the second axis, the angle is less than or equal to 65°, wherein the lever is configured to act on the cam due to the spring to drive the cam.

2. The device as claimed in claim 1, wherein the angle is greater than or equal to 30°.

3. The device as claimed in claim 1, wherein the lever comprises a roller intended to come into contact with the cam, the roller is made of hard material minimizing friction.

4. The device as claimed in claim 3, wherein the roller is mounted on the lever so as to pivot about a third axis.

5. The device as claimed in claim 3, wherein the roller has a radius less than or equal to 1 mm.

6. The device as claimed in claim 1, wherein the peak is a rounded surface having a radius less than 0.1 mm.

7. The device as claimed in claim 1, wherein the cam has at least one concave surface adjacent to the peak.

8. The device as claimed in claim 1, wherein the cam comprises at least one drive finger for the display element.

9. The device as claimed in claim 1, comprising a drive wheel that is a 24-hours wheel, and a connection that provides a degree of freedom between the drive wheel and the cam, wherein the connection includes a pin cooperating with an elongate cutout designed to secure the cam and the drive wheel.

10. The device as claimed in claim 1, wherein a distance between the second axis and a contact point of the lever with the cam or a distance between the second axis and the axis is less than or equal to 4 times a maximum radius of the cam or a distance between the first axis and the contact point.

11. A timepiece calendar system or module comprising a device as claimed in claim 1.

12. The system or module as claimed in claim 11, comprising a display element comprising a display disk, the display disk intended to cooperate with an aperture and/or intended to cooperate with at least one drive finger secured to the cam.

13. A timepiece movement comprising a system or module as claimed in claim 11.

14. A timepiece comprising a timepiece movement as claimed in claim 13.

15. A timepiece movement comprising a device as claimed in claim 1.

16. A timepiece comprising a device as claimed in claim 1.

17. The device as claimed in claim 1, wherein the cam has two concave surfaces on either side of the peak.

18. The device as claimed in claim 1, wherein the quantity associated with time or derived from time includes dates of a timepiece calendar.

19. The device as claimed in claim 1, wherein the connection includes a connection of a freewheel designed to secure the cam and the drive wheel.

* * * * *